(12) United States Patent
Balsells (10) Patent No.: US 8,375,543 B1
(45) Date of Patent: Feb. 19, 2013

(54) METHOD FOR CONTROLLING CONNECT AND DISCONNECT FORCES OF A CONNECTOR

(71) Applicant: Bal Seal Engineering, Inc., Foothill Ranch, CA (US)

(72) Inventor: Peter J. Balsells, Newport Beach, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 0 days.

(21) Appl. No.: 13/629,433

(22) Filed: Sep. 27, 2012

Related U.S. Application Data (60) Continuation of application No. 13/447,595, filed on Apr. 16, 2012, now Pat. No. 8,297,662, which is a continuation of application No. 12/577,033, filed on Oct. 9, 2009, now Pat. No. 8,166,623, which is a division of application No. 11/111,109, filed on Apr.

(Continued)

(51) Int. Cl.
*B23P 19/04* (2006.01)

(52) U.S. Cl. ............ 29/227; 29/225; 72/135; 267/167; 285/318; 285/321; 403/326; 403/355; 411/517

(58) Field of Classification Search .................... 29/225, 29/227; 285/318, 321; 72/135; 267/167; 403/326, 355; 411/517
See application file for complete search history.

(56) References Cited

U.S. PATENT DOCUMENTS

| | | | |
|---|---|---|---|
| 2,538,683 A | | 1/1951 | Guiler |
| 2,797,937 A | | 7/1957 | Frishof |
| 2,914,344 A | * | 11/1959 | Anthes ............................ 285/93 |
| 3,087,038 A | | 4/1963 | Bethke |
| 3,910,566 A | * | 10/1975 | Pedersen et al. ............... 267/167 |
| 4,632,434 A | * | 12/1986 | Proctor et al. ................... 285/39 |
| 4,655,462 A | * | 4/1987 | Balsells ......................... 267/167 |
| 4,678,210 A | * | 7/1987 | Balsells ......................... 285/318 |
| 4,763,683 A | | 8/1988 | Carmack |
| 4,804,290 A | * | 2/1989 | Balsells ......................... 403/326 |
| 4,805,943 A | * | 2/1989 | Balsells ......................... 285/318 |
| 4,826,144 A | * | 5/1989 | Balsells ......................... 267/167 |
| 4,830,344 A | * | 5/1989 | Balsells ......................... 267/167 |
| 4,906,109 A | * | 3/1990 | Balsells ......................... 384/26 |

(Continued)

OTHER PUBLICATIONS

Notice of Allowance mailed Jan. 12, 2012 from related U.S. Appl. No. 12/577,033, filed Oct. 9, 2009.
Final Office Action mailed May 25, 2011 from related U.S. Appl. No. 12/577,033, filed Oct. 9, 2009.
Office Action mailed Dec. 6, 2010 from related U.S. Appl. No. 12/577,033, filed Oct. 9, 2009.

(Continued)

*Primary Examiner* — Richard Chang
(74) *Attorney, Agent, or Firm* — Klein, O'Neill & Singh, LLP (57) ABSTRACT

A connector includes a housing having a bore with a housing groove disposed on an inside surface of the bore with a groove establishing a release angle between a housing groove bottom and a bore inside surface. A retainer defines a spring cavity between a retainer and the release angle and a circular radial canted coil spring is disposed in the spring cavity. A pin having a tapered end and a body diameter sized for sliding engagement with the bore is provided which includes a circumferential groove in the pin body for receiving the coil spring upon insertion of the pin into the bore. A circumferential groove includes a load angle for rotating the coil spring in an orientation in which the major spring axis is parallel to the release angle upon initial withdrawal of the pin from the bore. The coil is further compressed along the spring minor axis and expands radially upon continued withdrawal of the pin from the bore.

30 Claims, 6 Drawing Sheets

Related U.S. Application Data 21, 2005, now abandoned, which is a division of application No. 10/300,358, filed on Nov. 19, 2002, now abandoned.

(60) Provisional application No. 60/333,103, filed on Nov. 21, 2001.

(56) References Cited

U.S. PATENT DOCUMENTS

| | | | | |
|---|---|---|---|---|
| 5,082,390 | A | * | 1/1992 | Balsells ............... 403/326 |
| 5,098,241 | A | * | 3/1992 | Aldridge et al. ........ 411/433 |
| 5,108,078 | A | * | 4/1992 | Balsells ............... 267/167 |
| 5,139,243 | A | * | 8/1992 | Balsells ............... 267/167 |
| 5,139,276 | A | | 8/1992 | Balsells |
| 5,160,122 | A | * | 11/1992 | Balsells ............... 267/167 |
| 5,265,890 | A | * | 11/1993 | Balsells ............... 277/467 |
| 5,310,359 | A | * | 5/1994 | Chadbourne et al. ..... 439/462 |
| 5,411,348 | A | * | 5/1995 | Balsells ............... 403/326 |
| 5,474,309 | A | * | 12/1995 | Balsells ............... 277/651 |
| 5,545,842 | A | * | 8/1996 | Balsells ............... 174/372 |
| 5,727,821 | A | * | 3/1998 | Miller ................. 285/318 |
| 5,979,904 | A | * | 11/1999 | Balsells ............... 277/554 |
| 6,749,358 | B2 | * | 6/2004 | Balsells ............... 403/316 |

OTHER PUBLICATIONS

Office Action mailed Oct. 13, 2010 from related U.S. Appl. No. 12/577,033, filed Oct. 9, 2009.
Final Office Action mailed Jul. 20, 2009 from related U.S. Appl. No. 11/111,109, filed Apr. 21, 2005.
Final Office Action mailed Feb. 18, 2009 from related U.S. Appl. No. 11/111,109, filed Apr. 21, 2005.
Office Action mailed Nov. 4, 2008 from related U.S. Appl. No. 11/111,109, filed Apr. 21, 2005.
Office Action mailed Apr. 8, 2008 from related U.S. Appl. No. 11/111,109, filed Apr. 21, 2005.
Final Office Action mailed Nov. 28, 2007 from related U.S. Appl. No. 11/111,109, filed Apr. 21, 2005.
Final Office Action mailed Jul. 16, 2007 from related U.S. Appl. No. 11/111,109, filed Apr. 21, 2005.
Office Action mailed Jan. 9, 2007 from related U.S. Appl. No. 11/111,109, filed Apr. 21, 2005.
Office Action mailed Feb. 12, 2004 from related U.S. Appl. No. 10/300,358.
Final Office Action mailed Jan. 27, 2005 from related U.S. Appl. No. 10/300,358.

* cited by examiner

METHOD FOR CONTROLLING CONNECT AND DISCONNECT FORCES OF A CONNECTOR

CROSS-REFERENCE TO RELATED APPLICATIONS

This is a continuation of U.S. application Ser. No. 13/447,595, filed Apr. 16, 2012, which is a continuation of U.S. application Ser. No. 12/577,033, filed Oct. 9, 2009; which is a divisional application of U.S. application Ser. No. 11/111,109, filed Apr. 21, 2005, which is a divisional application of U.S. application Ser. No. 10/300,358, filed Nov. 19, 2002, which is a regular application of Provisional No. 60/333,103, filed Nov. 21, 2001, the contents of all of which are expressly incorporated herein by reference for all purposes.

The present invention is generally related to connecting mechanisms and is more particularly related to a connector that requires low force to connect and high force to disconnect.

BACKGROUND

Connectors have been used in a great variety of applications, see, for example. U.S. Pat. Nos. 4,678,210, 4,763,683, 5,411,348 and 5,545,842. Each of the connectors referenced are directed to specific applications.

For example, U.S. Pat. No. 4,678,210, provides for a loading and locking mechanism directed to engaging and interlocking lightweight, delicate and many times fragile cylindrical parts with one another and provides for locking means for preventing separation of a first and second cylindrical member.

U.S. Pat. No. 4,763,683 is directed to a breakaway coupling for a coaxial fuel supply hose and provides for inner-connecting valve bodies, which define a center fuel supply passage.

U.S. Pat. Nos. 5,411,348 and 5,545,842 are directed to mechanisms for connecting and locking parts for effecting electromagnetic shielding, electrical conductivity, heat dissipation and environmental sealing.

The present invention provides for a connector utilizing a radial canted coil spring positioned within a housing groove in a manner for controlling connect and disconnect forces with a groove pin.

SUMMARY

A connector in accordance with the present invention generally includes a housing having a bore with a groove disposed on an inside surface of the bore. The bore groove establishes a release angle between a housing groove bottom and the bore inside surface.

A retainer is provided for defining a spring cavity between the retainer and the release angle and a circular radial canted coil spring is disposed in the spring cavity. The coil spring includes a centerline, a major and a minor axis, as hereinafter described.

A pin is provided having a tapered end and a body diameter sized for sliding engagement with the bore inside surface. A circumferential groove is formed in the pin body for receiving the coil spring upon insertion of the pin into the bore.

The circumferential groove includes a load angle for rotating the coil spring in an orientation in which the spring major axis is parallel with the release angle upon initial withdrawal of the pin from the bore. Continued withdrawal compresses the coil spring along the spring minor axis and upon further withdrawal of the pin from the bore the spring expands radially.

More particularly, the load angle is disposed below a centerline of the coil spring, should the load angle be above the centerline of the coil spring, disconnect would not be possible. This distinguishes the present invention from the hereinabove referenced prior art patents.

More particularly, the housing groove may include a coil groove stop disposed between the release angle and the bore inside surface for limiting axial movement of the coil spring upon withdrawal of the pin from the bore.

The release angle may be disposed at between about 5° and about 90° to the centerline connector and is preferably disposed at between about 25° and about 65° to the connector centerline.

With the use of the stop means, hereinabove noted, the preferable release angle is between about 25° and about 30° to a centerline of the connector.

Still more particularly, the coil spring may be initially disposed within the cavity with a major axis disposed within an included angle of between about 30° and about 45°. In that regard, the coil spring may be initially disposed in the cavity in a convex orientation or in a concave orientation.

In all of the embodiments of the present invention, the load angle may be disposed at an angle of between about 50° and about 90° with the connector centerline and preferably at about 40° to the connector centerline.

Preferably, the coil spring has an inside diameter smaller than the pin body diameter, so that a force is provided which urges the coil spring toward the inside diameter of the pin groove. This facilitates insertion of the pin into the spring. In addition, preferably, the load angle means is greater than the release angle by at least 10.

Further, control of the ratio of connect to disconnect forces is provided by a spring having a ratio of coil width to coil height of between about 1 to about 1.5, preferably, between about 1 to about 1.04.

BRIEF DESCRIPTION OF THE DRAWINGS

The advantages and features of the present invention will be better understood by the following description when considered in conjunction with the accompanying drawings in which:

FIG. 1 is a side view, in partial cross section, of a connector in accordance with the present invention generally showing a housing with a bore and groove therein, a retainer for defining a spring cavity, a circular radial canted coil spring disposed in the cavity and a pin having a tapered end with a body diameter sized for sliding engagement with the bore inside surface;

DETAILED DESCRIPTION

With reference to FIG. 1, there is shown a connector 10, which includes a housing 12 having a bore 14, having a groove 16 disposed on an inside surface 18. The groove 16 establishes a release angle, or surface, 22 between a housing groove bottom 24 and the bore inside surface 18.

A retainer 28 is provided, which defines a spring cavity 30 between the retainer 28 and the release angle surface 22.

A circular radial canted coil spring 32 is disposed in the spring cavity 30 and a pin 34 having a tapered end 36 includes a body 38 having a diameter sized for sliding engagement with the bore inside surface 18.

Figure 2:
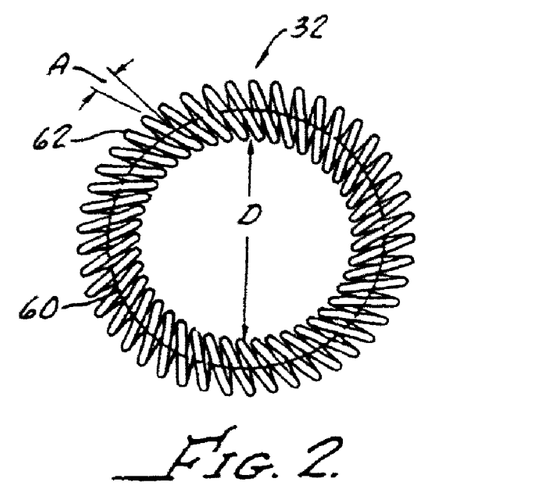
FIGS. 2-3 are front and right hand side views, respectively, of a radial canted coil spring for use in the present invention.
Figure 3:
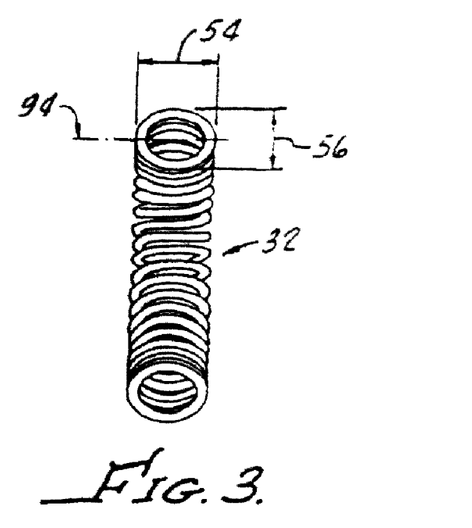
Figure 4:
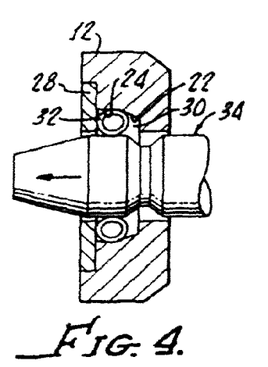
FIGS. 4-8 are similar to FIG. 1 showing stepwise insertion, or connect, and withdrawal, or disconnect, of the pin from the housing utilizing a release angle of 23° and further showing stop means disposed between the release angle and a bore inside surface for limiting axial movement of the coil upon withdrawal of the pin from the bore, the circumferential pin groove including a load angle for rotating the coil spring to an orientation in which the spring major axis is parallel to the release angle upon initial withdrawal of the pin from the bore.
Figure 5:
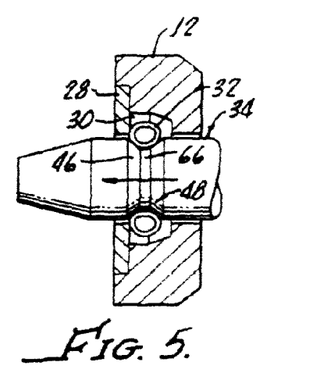
Figure 6:
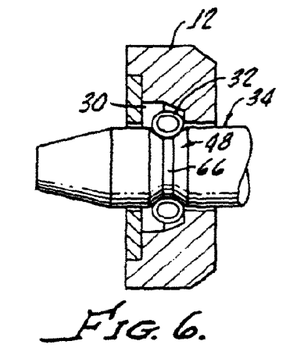
Figure 7:
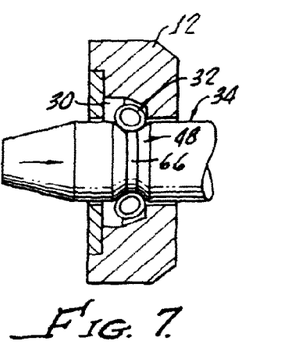
Figure 8:
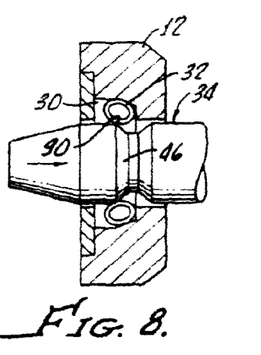

The pin 34 includes a circumferential pin groove 48 having a load angle, or surface, 46, which provides a means for rotating the spring 32 to an orientation in which a spring major axis 54, see FIGS. 2 and 3, is parallel with the release angle 22 upon initial withdrawal of the pin 34 from the bore 14, as will be hereinafter discussed in greater detail.

Further withdrawal of the pin 34 from the bore 14 compresses the coil spring 32 along a spring minor axis 56 (again, see FIGS. 2-3) and expands the spring 32 radially upon continued withdrawal of the pin 34 from the bore 14 as also discussed hereinafter.

With specific referenced to FIGS. 2 and 3, there is shown the circular radial canted coil spring 32 having a centerline 60 and a turn angle A. The turn angle A is the angle between the centerline 60 of the spring 32 and a centerline of the coils 62. Such springs 32 are described in U.S. Pat. Nos. 5,139,243, 5,108,076 and 4,893,795. These patents are to be incorporated herewith in their entirety by this specific reference thereto for describing the types of radial springs suitable for the present invention.

This spring 32 includes an inside diameter. D, which is smaller than the pin groove 48 diameter in order that the spring 32 is forced toward a pin groove bottom, or inside diameter, 66.

As shown in FIGS. 1 and 4-8, the release angle 22 is disposed at about 23° to a centerline 70 of the connector 10. It should be appreciate that this release angle may be disposed at between about 5° and 90° with the centerline 70 of the connector 10 in order to control, connect and disconnect forces, as hereinafter described.

With reference again to FIG. 1, the load angle. L, may be disposed at an angle of between about 50 and about 90° to the connector centerline 70, with about 40° being shown in FIGS. 1-8. This load angle surface contributes to the control of connects/release force ratios, as will be hereinafter discussed in greater detail.

Figure 9:
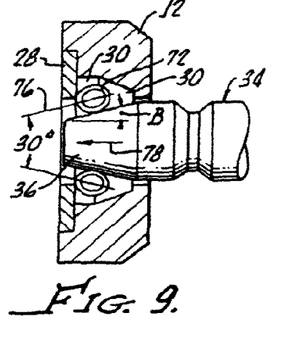
FIG. 9 is an alternative embodiment to the present invention in which the radial spring is initially disposed in the cavity in a concave orientation with an included angle of 30°

As shown in FIG. 9, a radial spring 72 may be initially disposed in the cavity 30 in a concave orientation with an included angle of between about 30° and about 45°, 30° being shown. In this arrangement, a major axis 76 is initially oriented in a direction toward a connect direction of the pin 34, as shown by the arrow 78.

Figure 10:
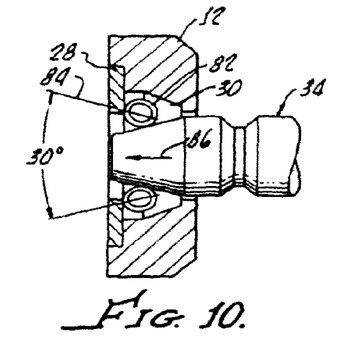
FIG. 10 is a view of another embodiment to the present invention in which the radial spring is initially disposed within the cavity in a convex orientation having an included angle of about 30°.
Figure 11:
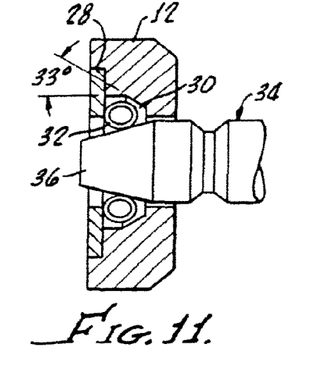
FIGS. 11-16 are similar to the embodiment shown in FIGS. 1 and 4-8 showing stepwise positions of the pin, spring and housing during connect and disconnect with a release angle of about 33°.
Figure 12:
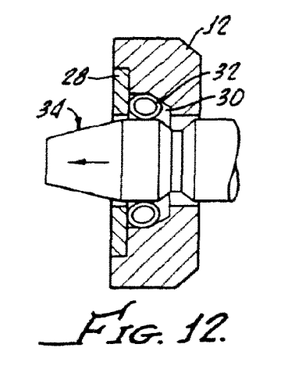
Figure 13:
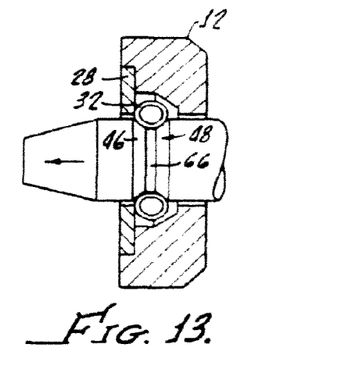
Figure 14:
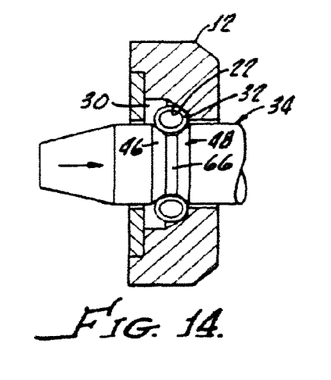
Figure 15:
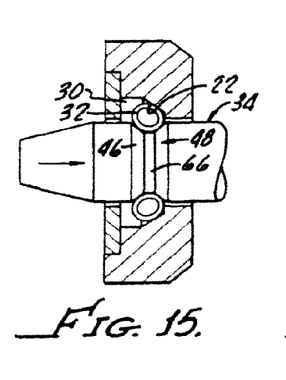
Figure 16:
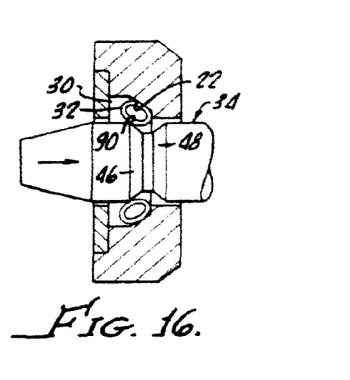
Figure 17:
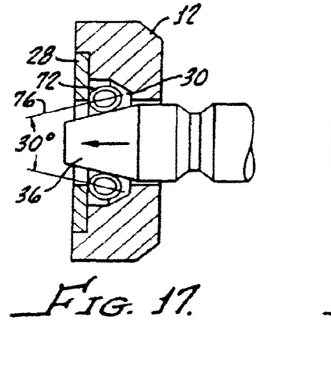
FIGS. 17-22 are similar to the embodiment shown in FIGS. 11-16 with the spring being initially disposed in the cavity in a concave orientation.
Figure 18:
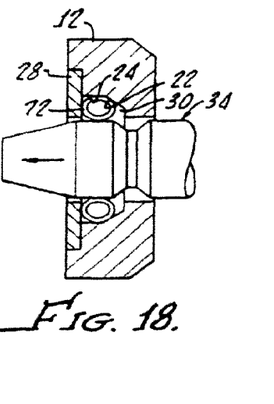
Figure 19:
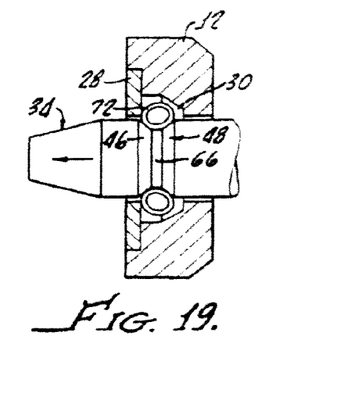
Figure 20:
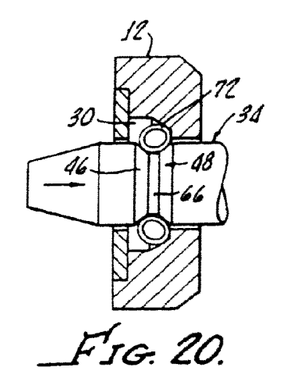
Figure 21:
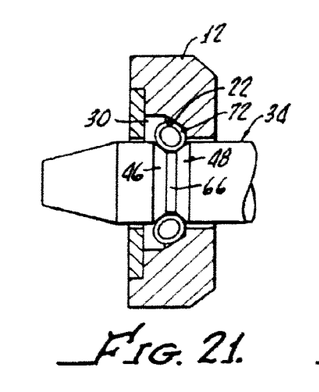
Figure 22:
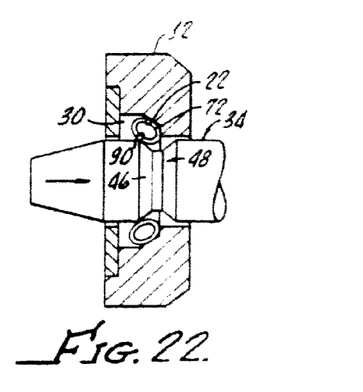
Figure 23:
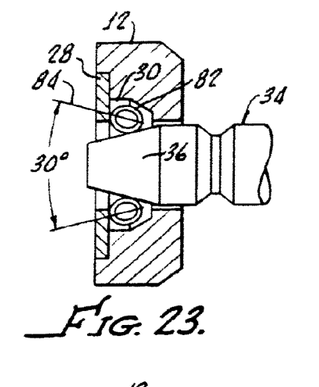
FIGS. 23-28 are similar to the embodiment shown in FIGS. 11-16 with the spring initially disposed in the cavity in a convex orientation.
Figure 24:
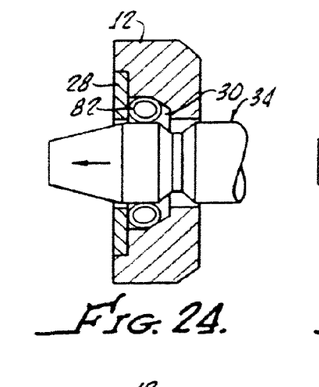
Figure 25:
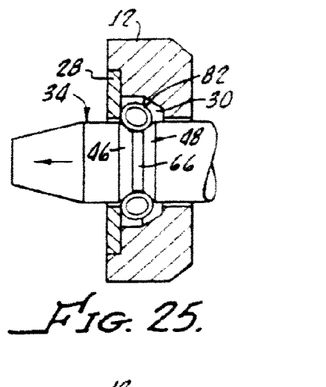
Figure 26:
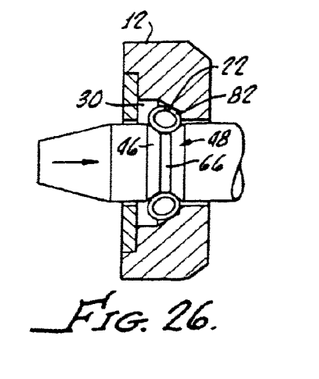
Figure 27:
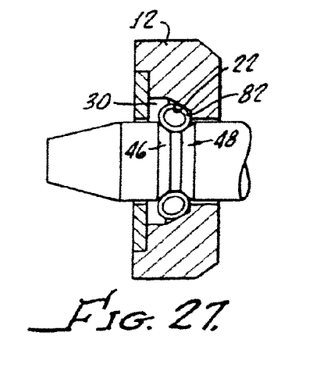
Figure 28:
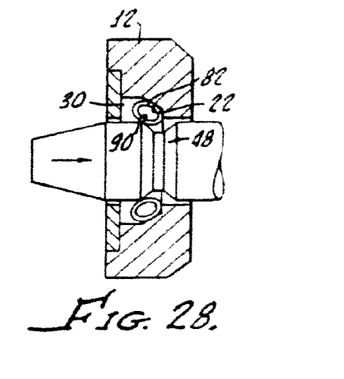
Figure 29:
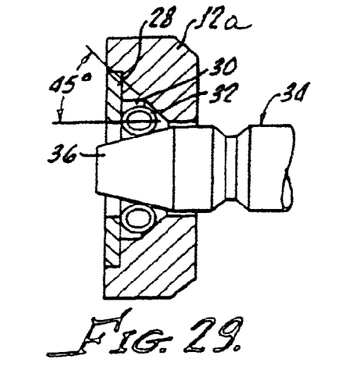
FIGS. 29-34 are similar to FIGS. 1 and 3-8 showing connect and disconnect steps with a release angle of about 45°.
Figures 30, 31:
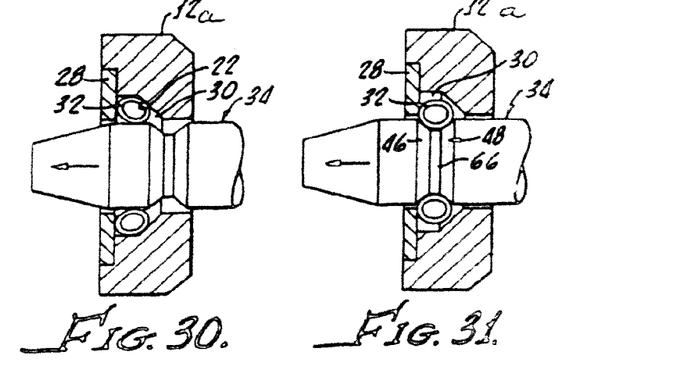
Figure 32:
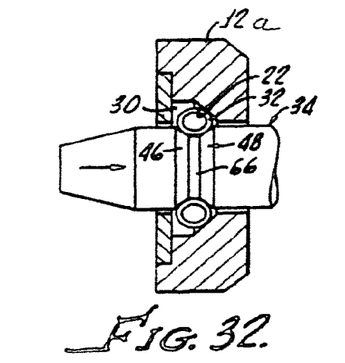
Figure 33:
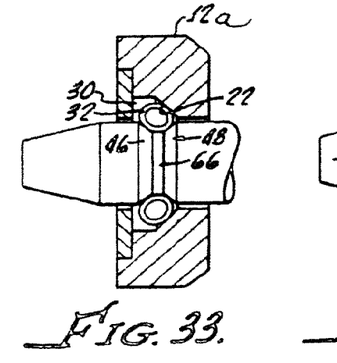
Figure 34:
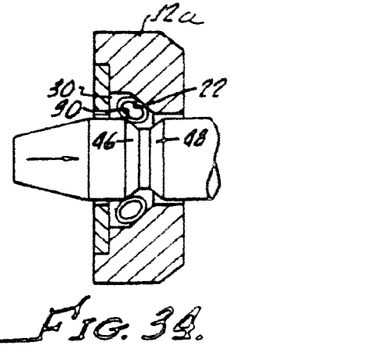

With reference to FIG. 10, there is shown a spring 82 disposed in a convex orientation within the cavity 30 having an included angle of between about 30° and about 45°, 30° being shown. In this arrangement, a coil major axis 84 is oriented against an insertion direction of the pin 34, as indicated by the arrow 86. It should be appreciated that common reference numbers used throughout the specification and all of the drawings represent identical or substantially similar components.

FIGS. 11-16 are similar to FIGS. 1 and 4-8 with a release angle of about 33°. Similarly, FIGS. 17-22 include a release angle at 33° utilizing the concave spring 72 and FIGS. 23-28 represent sequential connect and disconnect steps utilizing a convex spring 82 with a release angle of about 33°.

Figure 35:
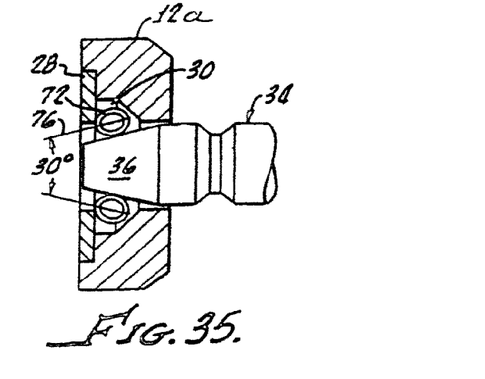
FIG. 35 is a view similar to FIG. 17 with a release angle at 45°.
Figure 36:
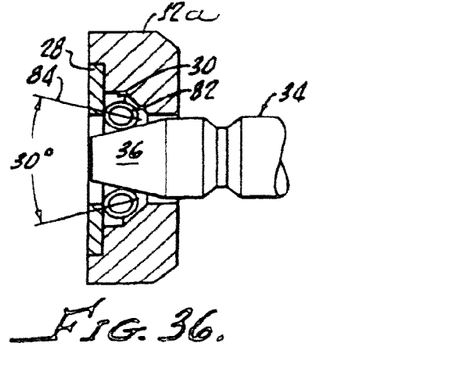
FIG. 36 is a connector similar to that shown in FIG. 10 with a release angle of 45'.

FIGS. 29-34 are similar to FIGS. 1 and 4-8 with a release angle at 45°. FIG. 35 is similar to FIG. 29 utilizing a concave spring 72 and FIG. 36 utilizing the convex spring 82 sequential connect/disconnect steps are represented in FIGS. 30-34.

Figure 37:
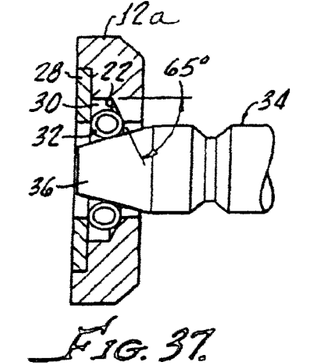
FIGS. 37-38 shown an embodiment in which the release angle is 65°.
Figure 38:
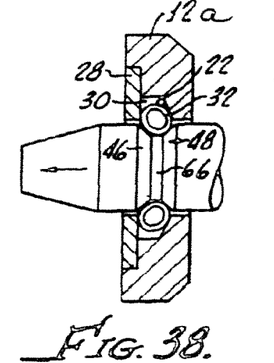
Figure 39:
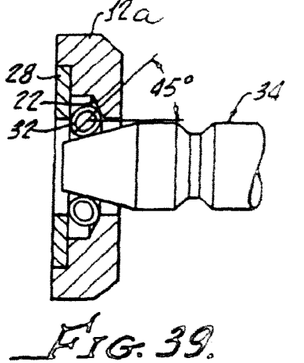
FIGS. 39-40 are similar to the embodiment shown in FIGS. 37-38 utilizing a radial spring in a concave orientation with an included angle at 45° and a release angle of 65°.
Figure 40:
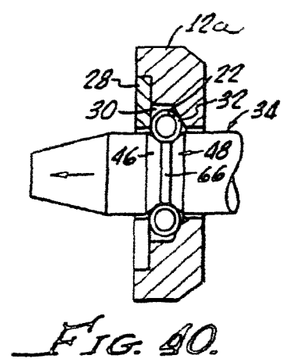
Figure 41:
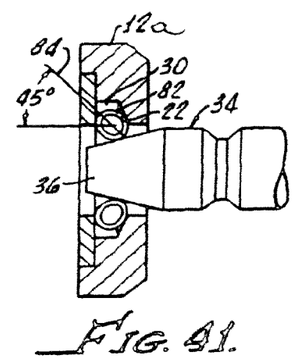
FIGS. 41-45 shows stepwise connect and disconnect sequential movement of the pin in housing utilizing a radial spring in a convex orientation with an included angle of 45° and a release angle of 65°.
Figure 42:
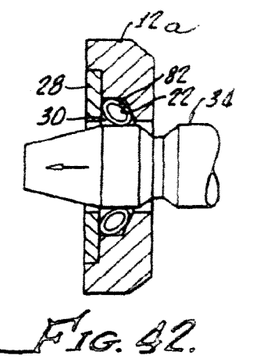
Figure 43:
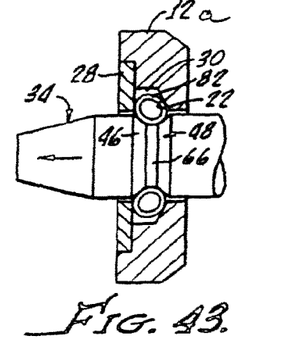
Figure 44:
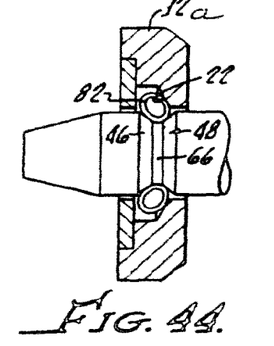
Figure 45:
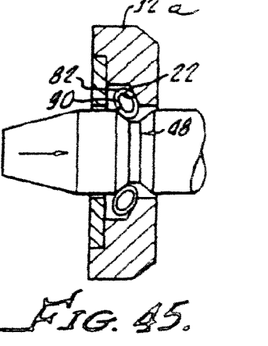

FIGS. 37 and 38 are similar to FIG. 1, with a release angle of 65° with a corresponding concave spring 72 and convex spring 82 being shown in FIGS. 39 and 40.

FIGS. 41-45 shows the convex spring 82 with sequential connect and disconnect steps with a release angle of 65°.

Variation of the load angle 46 to the release angle 22 affects the force required to disconnect. The larger the release angle 22, the higher the force to disconnect. The larger the load angle 46 the greater the force required to disconnect. The greater the release angle 22 the greater the coiled 62 reflection and the greater the force required to disconnect.

As hereinabove noted, the closer the radial centerline 70 of the spring 32 to a load point 90 at the intersection of the pin body 38 with the load angle surface 46 (see FIG. 1) the higher the disconnect force preparing in mind. However, if the load point 90 is above the centerline 70 disconnect is not possible.

As shown in FIG. 1, the radial spring 32 has a 0° turn angle that is a major axis 94 (see FIG. 1) is parallel with the connector centerline 70. The concave springs 72 have an included angle of between 1° and 89° included angle and the convex spring 82 has a turn angle of between about 10 and 89° included angle, with 30° being shown in the FIGS. 17-22 and 23-28 respectively.

Concave springs 72 have the advantage of reduced force during initial connection when the concave angle is the same as the entry angle B, see FIGS. 1 and 9 of the pin 34 because minimum force is require to turn the spring 72 during connection. If the angles of the springs 32, 82 and the entry angle B are different the tapered end 36 of the pin 34 must turn the spring 32, 82 so that the major axis 94, 84 is parallel to the entry angle B of the tapered end 36 of the pin 34. The higher the variation that exists between the entry angle B of the tapered end 32 of the pin 34 and the turn angle of the spring the higher the force will be required to connect.

As shown in FIGS. 1 and 4-8, the radial spring 32 has a major axis 94, which is parallel to the centerline 70, 60 of the spring 32, see FIGS. 2-3. This type of spring 32 is desirable when the pin 34 has no chamfer, or tapered end, not shown.

In this case, the pin 32 outside diameter at entry will be parallel to the major axis of coil since the inside diameter of the spring 32 is generally smaller than the pin body outside diameter 38. A tapered end, or chamfer, 36 is desirable for facilitating assembly. The tapered end 36 reduces the force required to connect, which is important since an objective of the present invention is to maximize the ratio of disconnect to connect force.

The concave spring 72 has the advantage that the tapered end 36 of the pin 34 at the entry angle can be made parallel to the concave angle. In this manner, the initial force required to connect is minimized by making the spring concave angle the same as the tapered end 36.

The convex spring 82 requires substantially greater force at entry because it will be necessary to turn this spring 82 to the position of the entry angle of the tapered end 36 of the pin 34. Thus, the convex spring 82 is desirable and applications for a high entry force is desirable.

When connection takes place, the spring 32, 72, 82 positions itself at the normal or initial position at the bottom 66 of the pin groove 48. The force required to disconnect the connector 10 varies depending upon the type of spring 32, 72, 82 utilized be it the radial 32, radio concave 72 or radio convex 82 with the concave spring 72 requiring more force to disconnect than the radial spring 32 and convex spring 82. The reason for this force difference is due to the fact that the spring 32, 72, 82 must position itself with the major axis 76, 84, 94 of the coil parallel to the release angle surface 22 in the housing 12, and that requires turning of the spring 32, 72, 82.

The concave spring 72 requires greater ° of turning of the coil in the convex spring 82 and the more turning the spring 72, 82, the more stresses are parted to the spring causing greater force at disconnect. For these reasons, the spring 32, 72, 82 that requires minimum amount of turning results in minimum disconnect force and maximum turning results and maximum disconnect force. The concave spring 72 offers greater variation between disconnect and connect ratio because it requires less force to connect and greater forces to disconnect. When this feature is desirable to concave spring 72 has significant advantage.

In general, there are four main factors that affect the selection of the spring for maximum connect or disconnect ratio. They are:

a. A connector whose entry angle is parallel to the entry angle of the spring.

b. A coil that when deflected radially during the connecting process has the minimum amount of frictional force. A concave spring will have less frictional force.

c. A spring that when it is in the connect position will assume a turn angle that will require maximum turning, thus creating greater stresses on the spring and upon deflecting the disconnect will create a higher force.

d. A spring when deflected at disconnect will develop a higher force by varying the release angle. The higher the release angle, the higher the amount of spring deflection and the higher the force developed at disconnect.

In addition to the type of spring used, the many factors that will affect the disconnect force.

a. The larger the release angle of the housing, the greater the force required to disconnect.

b. The larger the load angle, the greater the force required to disconnect.

c. The larger wire diameter of the spring coil, the greater the force developed and the higher the force required to disconnect.

d. The smaller the ratio of the coil width to the coil height, the rounder the cross section of the coil will be and the higher the force to disconnect. The typical desirable ratio to develop higher force would be 1 to 1.04.

e. The smaller the back angle of the coil, the higher the force required to disconnect.

f. The smaller the front angle of the coil, the higher the force required to disconnect.

g. The relationship between the centerline of the spring coil in a connect position to the diameter of the pin at the load point. The shorter the radial distance between the centerline of the coil and the load point, the greater the axial force developed at disconnect and the greater the force required to disconnect.

h. The higher the modulus of elasticity of the wire, the higher the force to disconnect. Therefore, the selection of the spring material becomes a very important factor in maximizing the ratio of disconnect to connect.

i. The relationship between the load angle and the release angle. The load angle must always be larger than the release angle. The smaller the difference between the two, the greater the force required to disconnect. For most applications, a variation between the two of 70 appears to work satisfactorily.

j. The force required to stretch the spring during connection. The higher the force, the lower the ratio of disconnect to connect.

k. For this type of application, a spring force that increases with deflection is highly desirable. This characteristic can be achieved in a canted coil spring by controlling the ratio of the coil height to wire diameter. The smaller the ratio, the higher the force as a function of spring deflection.

With the present invention, the ratio of disconnect force to connect force may be as high as 30 to 1. FIGS. 1 and 4-8 illustrate sequential position of the pin 34 and housing 12 utilizing a release angle 22 of the 23°. FIGS. 11-16 illustrate the connect disconnect steps utilizing a release angle of 33° and FIGS. 29-34 show the connect/disconnect steps with a release angle at 45°. These figures show a comparison between the effect that the release angle 22 has on the axial play and deflection of the spring 32. As hereinabove noted, the smaller the release angle 22 the lower the force developed. The larger the release angle 22 the higher the deflection and the higher the force developed to disconnect.

It should be appreciate that the actual play of the pin 34 varies with the release angle 22. By way of specific example, at small angles, that is 23° and 33° the axial play is approximately the same at about 0.007 inches. As a release angle 22 increases to 45° the axial play decreases to 0.004 inches with the same dimensions. See FIGS. 29-36. The axial deflection is 0. All of the springs 22, 72, 82 (see FIGS. 37-45).

Although there has been hereinabove described a specific connector with radial spring in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element, which is not specifically disclose herein. Accordingly, any and all modifications, variations or equivalent arrangements which may occur to those skilled in the art, should be considered to be within the scope of the present invention as defined in the appended claims.

What is claimed is:

1. A method for latching a pin to a housing and unlatching the pin from the housing a spring, said method comprising:
   providing a pin comprising an elongated body defining a pin longitudinal axis, a pin insertion end comprising a tapered surface relative to the pin longitudinal axis, and a pin groove disposed about said elongated body, said pin groove comprising a V-groove comprising two tapered surfaces that converge in a direction of the pin longitudinal axis;
   providing a housing comprising a housing bore defining a lengthwise housing axis; said housing bore comprising a housing groove disposed on an inside surface of said housing bore and comprising a tapered surface and a sidewall extending therefrom, said tapered surface being tapered relative to the lengthwise housing axis and said sidewall being generally perpendicular to the lengthwise housing axis;
   receiving a canted coil spring, said canted coil spring comprising a plurality of coils each comprising a major axis, a minor axis, and a wire diameter sized to cooperate with the pin groove and the housing groove to permit latching of the pin to the housing and unlatching of the pin from the housing;
   moving the pin in a first direction relative to the housing to capture the canted coil spring between the pin groove and the housing groove to latch the pin to the housing, said step of moving the pin in the first direction causes the tapered surface of the pin insertion end to lift the plurality of coils and produces a connect force;
   wherein at least one of the two tapered surfaces of the pin groove abuts the plurality of coils and lifts the plurality of coils when moving the pin in a second direction relative to the housing to disconnect the pin from the housing, said second direction being opposite the first direction and said movement in the second direction produces a disconnect force; and
   wherein the disconnect force to disconnect the pin from the housing is greater than the connect force to connect the pin to the housing.

2. The method of claim 1, wherein one of the two tapered surfaces of the pin groove defines a load angle and wherein tapered surface of the housing groove defines a release angle.

3. The method of claim 1, further comprising a pin bottom located between the two tapered surfaces of the pin groove.

4. The method of claim 1, wherein the housing groove further comprises a groove bottom surface extending from the tapered surface, the tapered surface defining a release angle with the groove bottom surface.

5. The method of claim 2, wherein the plurality of coils are spaced from the tapered surface of the housing groove when located in both the pin groove and the housing groove.

6. The method of claim 1, wherein the disconnect force is at least 1.5 times up to 30 times greater than the connect force.

7. The method of claim 1, wherein one of the two tapered surfaces that converge in the direction of the pin longitudinal axis defines a load surface having a load angle relative to the pin longitudinal axis of between 5 degrees and 90 degrees.

8. The method of claim 1, further comprising moving the pin in the second direction relative to the housing to unlatch the pin from the housing.

9. The method of claim 4, further comprising a sidewall extending from the groove bottom surface of the housing groove, said sidewall being generally perpendicular to the lengthwise housing axis.

10. A method for latching a pin to a housing and unlatching the pin from the housing a spring, said method comprising:
    providing a pin comprising an elongated body defining a pin longitudinal axis, a pin insertion end comprising a tapered surface relative to the pin longitudinal axis, and a pin groove disposed about said elongated body, said pin groove comprising a V-groove comprising two tapered surfaces that converge in a direction of the pin longitudinal axis;
    providing a housing comprising a housing bore defining a lengthwise housing axis; said housing bore comprising a housing groove disposed on an inside surface of said housing bore and comprising a groove bottom surface being generally parallel to the lengthwise housing axis;
    providing a canted coil spring, said canted coil spring comprising a plurality of coils each comprising a major axis, a minor axis, and a wire diameter sized to cooperate with the pin groove and the housing groove to permit latching of the pin to the housing and unlatching of the pin from the housing;
    moving the pin in a first direction relative to the housing to capture the canted coil spring between the pin groove and the housing groove to latch the pin to the housing, said moving the pin in the first direction causes
    the tapered surface of the pin insertion end to lift the plurality of coils and produces a connect force;
    wherein at least one of the two tapered surfaces of the pin groove abuts the plurality of coils and lifts the plurality of coils when moving the pin in a second direction relative to the housing, which is opposite the first direction, to disconnect the pin from the housing, said movement in the second direction produces a disconnect force that is greater than the connect force.

11. The method of claim 10, wherein one of the two tapered surfaces of the pin groove defines a load angle.

12. The method of claim 10, further comprising a pin bottom located between the two tapered surfaces of the pin groove.

13. The method of claim 10, wherein the housing groove comprises a tapered release surface extending from the groove bottom surface and defining a release angle with the groove bottom surface.

14. The method of claim 11, wherein the plurality of coils are spaced from the groove bottom surface of the housing groove when located in both the pin groove and the housing groove.

15. The method of claim 10, wherein the disconnect force is at least 1.5 times up to 30 times greater than the connect force.

16. The method of claim 10, wherein one of the two tapered surfaces that converges in the direction of the pin longitudinal axis defines a load surface having a load angle relative to the pin longitudinal axis of between 5 degrees and 90 degrees.

17. The method of claim 10, further comprising moving the pin in the second direction relative to the housing to unlatch the pin from the housing.

18. The method of claim 13, further comprising a sidewall extending from the tapered release surface, said sidewall being generally perpendicular to the lengthwise housing axis.

19. A method for manufacturing a connector comprising a pin and a housing that latches and unlatches, said method comprising:

forming a pin comprising an elongated body defining a pin longitudinal axis, a pin insertion end comprising a tapered surface relative to the pin longitudinal axis, and a pin groove disposed about said elongated body, said pin groove comprising two tapered surfaces that converge in a direction of the pin longitudinal axis;

forming a housing comprising a housing bore defining a lengthwise housing axis; said housing bore comprising a housing groove disposed on an inside surface of said housing bore and comprising a tapered surface, said tapered surface being tapered relative to the lengthwise housing axis;

moving the pin in a first direction relative to the housing to capture a canted coil spring between the pin groove and the housing groove to latch the pin to the housing, said canted coil spring comprising a plurality of coils each comprising a major axis, a minor axis, and a wire diameter sized to cooperate with the pin groove and the housing groove to permit latching and unlatching;

wherein the tapered surface of the pin insertion end lifts the plurality of coils during insertion of the pin in the first direction into the housing bore, said movement in the first direction produces a connect force; and wherein at least one of the two tapered surfaces of the pin groove abuts the plurality of coils and lifts the plurality of coils when the pin is moved in a second direction relative to the housing, which is opposite the first direction, said movement in the second direction produces a disconnect force.

20. The method of claim 19, wherein the disconnect force is greater than the connect force.

21. The method of claim 20, further comprising a pin bottom located between the two tapered surfaces of the pin groove.

22. The method of claim 19, wherein the housing groove further comprises a groove bottom surface extending from the tapered surface, the tapered surface defining a release angle with the groove bottom surface.

23. The method of claim 22, wherein the plurality of coils are spaced from the groove bottom surface of the housing groove when located in both the pin groove and the housing groove.

24. The method of claim 19, wherein the disconnect force is at least 1.5 times up to 30 times greater than the connect force.

25. The method of claim 20, wherein the housing groove comprises a groove width and wherein the groove width is larger than the major axis of the spring so that the canted coil spring is positioned with the major axis generally parallel to the pin longitudinal axis during latching between the pin and housing.

26. The method of claim 21, further comprising moving the pin in the second direction relative to the housing to unlatch the pin from the housing.

27. The method of claim 25, further comprising a sidewall extending from the groove bottom surface of the housing groove, said sidewall being generally perpendicular to the pin longitudinal axis.

28. The method of claim 20, wherein the housing groove further comprises a sidewall extending from the tapered surface, said sidewall being generally perpendicular to the pin longitudinal axis.

29. A method for manufacturing a combination connector comprising a pin and a housing that latches and unlatches and a canted coil spring, said method comprising:

forming a pin comprising an elongated body defining a pin longitudinal axis, a pin insertion end comprising a tapered surface relative to the pin longitudinal axis, and a pin groove disposed about said elongated body, said pin groove comprising two tapered surfaces that converge in a direction of the pin longitudinal axis;

forming a housing comprising a housing bore defining a lengthwise housing axis; said housing bore comprising a housing groove disposed on an inside surface of said housing bore and comprising a tapered surface, said tapered surface being tapered relative to the lengthwise housing axis;

forming a canted coil spring, said canted coil spring comprising a plurality of coils each comprising a major axis, a minor axis, and a wire diameter sized to cooperate with the pin groove and the housing groove to permit latching the pin to the housing when moving the pin in a first direction with a latching force that is less that an unlatching force when moving the pin in a second direction, which is opposite the first direction, to unlatch the pin from the housing;

wherein the tapered surface of the pin insertion end is structured to lift the plurality of coils during insertion of the pin in the first direction to latch the pin to the housing; and wherein at least one of the two tapered surfaces of the pin groove is structured to abut the plurality of coils and lifts the plurality of coils when moving the pin in the second direction relative to the housing to unlatch the pin from the housing.

30. The method of claim 29, further comprising moving the pin in the first direction to latch the pin to the housing.

* * * * *

UNITED STATES PATENT AND TRADEMARK OFFICE
CERTIFICATE OF CORRECTION

| | | |
|---|---|---|
| PATENT NO. | : 8,375,543 B1 | Page 1 of 1 |
| APPLICATION NO. | : 13/629433 | |
| DATED | : February 19, 2013 | |
| INVENTOR(S) | : Peter J. Balsells | |

It is certified that error appears in the above-identified patent and that said Letters Patent is hereby corrected as shown below:

In column 1, line 26, delete "example." and insert -- example, --, therefor.

In column 2, line 67, after "30°" insert -- ; --.

In column 3, line 20, delete "45';" and insert -- 45°; --, therefor.

In column 3, line 45, delete "surface." and insert -- surface --, therefor.

In column 3, line 64, delete "diameter." and insert -- diameter --, therefor.

In column 4, line 7, delete "angle." and insert -- angle --, therefor.

In column 7, line 12, in Claim 1, after "housing" insert -- using --.

In column 8, line 9, in Claim 10, after "housing" insert -- using --.

In column 10, line 35, in Claim 29, after "less" delete "that" and insert -- than --, therefor.

Signed and Sealed this
Ninth Day of April, 2013

Teresa Stanek Rea
*Acting Director of the United States Patent and Trademark Office*

(12) INTER PARTES REVIEW CERTIFICATE (115th)
United States Patent (10) Number: US 8,375,543 K1
Balsells (45) Certificate Issued: Jan. 12, 2016

(54) METHOD FOR CONTROLLING CONNECT AND DISCONNECT FORCES OF A CONNECTOR (71) Applicant: Bal Seal Engineering, Inc.

(72) Inventor: Peter J. Balsells

(73) Assignee: Bal Seal Engineering, Inc.

Trial Number:

IPR2014-00573 filed Apr. 3, 2014

Petitioner: Nelson Products, Inc.

Patent Owner: Bal Seal Engineering, Inc.

Inter Partes Review Certificate for:

Patent No.: 8,375,543
Issued: Feb. 19, 2013
Appl. No.: 13/629,433
Filed: Sep. 27, 2012

The results of IPR2014-00573 are reflected in this inter partes review certificate under 35 U.S.C. 318(b).

INTER PARTES REVIEW CERTIFICATE
U.S. Patent 8,375,543 K1
Trial No. IPR2014-00573
Certificate Issued Jan. 12, 2016

AS A RESULT OF THE INTER PARTES REVIEW PROCEEDING, IT HAS BEEN DETERMINED THAT:

Claims 1, 2, 5, 7, 10-12 and 19-29 are disclaimed.

\* \* \* \* \*